US012292514B2

(12) United States Patent
Wang et al.

(10) Patent No.: US 12,292,514 B2
(45) Date of Patent: May 6, 2025

(54) IONOSPHERE GRID HISTORY AND COMPRESSION FOR GNSS POSITIONING

(71) Applicant: QUALCOMM Incorporated, San Diego, CA (US)

(72) Inventors: Min Wang, Tustin, CA (US); Ning Luo, Cupertino, CA (US); Gengsheng Zhang, Cupertino, CA (US); Kannan Muthuraman, Mission Viejo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/317,871

(22) Filed: May 15, 2023

(65) Prior Publication Data

US 2023/0288570 A1 Sep. 14, 2023

Related U.S. Application Data

(63) Continuation of application No. 17/377,255, filed on Jul. 15, 2021, now Pat. No. 11,686,850.

(51) Int. Cl.
*G01S 19/07* (2010.01)
*G01S 19/40* (2010.01)

(52) U.S. Cl.
CPC ............ *G01S 19/072* (2019.08); *G01S 19/40* (2013.01)

(58) Field of Classification Search
CPC ............................... G01S 19/072; G01S 19/40
(Continued)

(56) References Cited

U.S. PATENT DOCUMENTS 10,852,439 B1    12/2020   Wang et al.
2013/0234886 A1   9/2013   Trilles et al.
(Continued)

FOREIGN PATENT DOCUMENTS

CA        2971587 A1    1/2018
CN     107390233 A   11/2017
(Continued)

OTHER PUBLICATIONS

International Search Report and Written Opinion—PCT/US2022/072545—ISA/EPO—Dec. 13, 2022.
(Continued)

*Primary Examiner* — Harry K Liu
(74) *Attorney, Agent, or Firm* — QUALCOMM Incorporated

(57) ABSTRACT

Described are methods, systems, and devices for correcting ionospheric error. In some aspects, a mobile device equipped with a Global Navigation Satellite System (GNSS) receiver is configured to determine a positioning measurement of a GNSS signal. The mobile device is further configured to receive augmentation data from an augmentation system. When the mobile device is unable to obtain newer augmentation data, the mobile device can instead obtain augmentation data associated with historical Total Electron Content (TEC) values. In such instances, the augmentation data will have been generated to represent ionospheric delay during a time period that ended before the augmentation data is obtained. Based on the augmentation data associated with historical TEC values and a pierce point of the received GNSS signal, an ionospheric error in the positioning measurement of the GNSS signal can be determined and corrected.

30 Claims, 11 Drawing Sheets

(58) Field of Classification Search
USPC .................................................. 342/357.23
See application file for complete search history.

(56) References Cited

U.S. PATENT DOCUMENTS

| | | | |
|---|---|---|---|
| 2014/0009331 | A1 | 1/2014 | Tominaga et al. |
| 2014/0163938 | A1 | 6/2014 | Sparks et al. |
| 2016/0282470 | A1 | 9/2016 | McDonald et al. |
| 2016/0377730 | A1 | 12/2016 | Drescher et al. |
| 2019/0056505 | A1 | 2/2019 | Morley |
| 2019/0271782 | A1 | 9/2019 | Liu et al. |
| 2019/0339394 | A1* | 11/2019 | Limberger .............. G01S 19/07 |
| 2021/0042879 | A1 | 2/2021 | Karasawa |
| 2021/0211821 | A1 | 7/2021 | Lorho et al. |
| 2022/0187473 | A1* | 6/2022 | Moorman .............. G06N 3/045 |
| 2023/0017707 | A1 | 1/2023 | Wang |
| 2024/0077620 | A1* | 3/2024 | Smolyakov ........... G01S 19/071 |

FOREIGN PATENT DOCUMENTS

| | | | |
|---|---|---|---|
| CN | 109828288 | A | 5/2019 |
| CN | 111045046 | A | 4/2020 |
| CN | 111125609 | A | 5/2020 |
| CN | 110146904 | B | 3/2021 |
| CN | 112444825 | A * | 3/2021 |
| CN | 112684475 | A | 4/2021 |
| DE | 102016223587 | B3 | 3/2018 |
| EP | 3537182 | A1 | 9/2019 |
| WO | WO 2021082191 | A1 | 5/2021 |
| WO | WO-2021091367 | A1 * | 5/2021 |
| WO | WO-2021211805 | A9 * | 11/2022 ............. G01S 19/32 |

OTHER PUBLICATIONS

Komjathy A., et al., "The Ionospheric Impact of the Oct. 2003 Storm Event on WAAS", Ion GNSS 17th International Technical Meeting of the Satellite Division of the Institute of Navigation, Washington, DC, US, Sep. 21-24, 2004, pp. 1298-1307, XP002385760, p. 1299, Left Column, Ln 1-6, Figure 4, p. 1300, Left Column, Ln 16-19, p. 1301, Left Column, Ln 10-28, 39-40, p. 1301, Right Column, Ln 16-28, Analysis of Results, p. 1303.
Partial International Search Report—PCT/US2022/072545—ISA/EPO—Sep. 16, 2022.
Swamy K.C.T., et al., "Accuracy Evaluation of Estimated Ionospheric Delay of GPS Signals Based on Klobuchar and IRI-2007 Models in Low Latitude Region", IEEE Geoscience and Remote Sensing Letters, IEEE, USA, vol. 10, No. 6, Nov. 1, 2013, pp. 1557-1561, XP011529457, Figure 2, Introduction, p. 1557, III Experimental Setup, p. 1558, IV Results and discussion, p. 1558, p. 1559, Right-Hand col. B, Autumn Equinox, p. 1560.

* cited by examiner

500

502
Determine a positioning measurement of a GNSS signal

504
Obtain augmentation data associated with Total Electron Content (TEC) values during one or more prior measurement periods.

506
Obtain a pierce point of the GNSS signal

508
Determine an ionospheric error in the positioning measurement of the GNSS signal based on the pierce point and the augmentation data

510
Correct the ionospheric error in the positioning measurement of the GNSS signal using the ionospheric error determined in 508

FIG. 5

$$f(\theta, \varphi) = A_0^0 * P_0^0(\cos\theta) +$$

$$+ A_1^0 * P_1^0(\cos\theta) + A_1^1 * [\cos(\varphi) * P_1^1(\cos\theta)] + B_1^1 * [\sin(\varphi) * P_1^1(\cos\theta)] +$$

$$+ A_2^0 * P_2^0(\cos\theta) + A_2^1 * [\cos(\varphi) * P_2^1(\cos\theta)] + B_2^1 * [\sin(\varphi) * P_2^1(\cos\theta)] + A_2^2 * [\cos(2\varphi) * P_2^2(\cos\theta)] + B_2^2 * [\sin(2\varphi) * P_2^2(\cos\theta)]$$

$$+ \ldots$$

$$+ A_M^0 * P_M^0(\cos\theta) + A_M^1 * [\cos(\varphi) * P_M^1(\cos\theta)] + B_M^1 * [\sin(\varphi) * P_M^1(\cos\theta)] + \ldots + A_M^M * [\cos(M\varphi) * P_M^M(\cos\theta)] + B_M^M * [\sin(M\varphi) * P_M^M(\cos\theta)]$$

$$+ \ldots$$

$$+ A_N^0 * P_N^0(\cos\theta) + A_N^1 * [\cos(\varphi) * P_N^1(\cos\theta)] + B_N^1 * [\sin(\varphi) * P_N^1(\cos\theta)] + \ldots + A_N^M * [\cos(M\varphi) * P_N^M(\cos\theta)] + B_N^M * [\sin(M\varphi) * P_N^M(\cos\theta)]$$

$$P_0^0(cos\theta)$$

$$P_1^0(cos\theta), \quad [cos(\varphi) * P_1^1(cos\theta)], \quad [sin(\varphi) * P_1^1(cos\theta)]$$

$$P_2^0(cos\theta), \quad [cos(\varphi) * P_2^1(cos\theta)], \quad [sin(\varphi) * P_2^1(cos\theta)]$$

$$\quad\quad\quad\quad\quad [cos(2\varphi) * P_2^2(cos\theta)], \quad [sin(2\varphi) * P_2^2(cos\theta)]$$

...

$$P_M^0(cos\theta), \quad [cos(\varphi) * P_M^1(cos\theta)], \quad [sin(\varphi) * P_M^1(cos\theta)]$$

...

$$\quad\quad\quad\quad\quad [cos(M\varphi) * P_M^M(cos\theta)], \quad [sin(M\varphi) * P_M^M(cos\theta)]$$

...

$$P_N^0(cos\theta), \quad [cos(\varphi) * P_N^1(cos\theta)], \quad [sin(\varphi) * P_N^1(cos\theta)]$$

...

$$\quad\quad\quad\quad\quad [cos(M\varphi) * P_N^M(cos\theta)], \quad [sin(M\varphi) * P_N^M(cos\theta)]$$

IONOSPHERE GRID HISTORY AND COMPRESSION FOR GNSS POSITIONING

CROSS-REFERENCE TO RELATED APPLICATIONS

This application is a continuation of U.S. Non-Provisional application Ser. No. 17/377,255, filed Jul. 15, 2021, entitled "Ionosphere Grid History and Compression for GNSS Positioning", which is incorporated herein by reference in its entirety.

BACKGROUND

1. Field of Invention

The present invention relates generally to the field of satellite-based positioning, and more specifically to error correction of Global Navigation Satellite System (GNSS) measurements based on information about ionospheric delay, for more accurate position determination.

2. Description of Related Art

GNSS based positioning involves estimating a position of a mobile receiver based on measurements obtained using reference signals from satellites, for example, satellites of the Global Positioning System (GPS). GNSS based positioning is capable of estimating position with a high degree of accuracy (e.g., several centimeters), but is nevertheless subject to errors due to signal delay, attenuation, multi-path errors, and other sources of error. When errors are present, the accuracy can be degraded substantially (e.g., to several meters). One significant source of error is the impact of the ionosphere on the propagation time of the reference signals. When GNSS signals travel through the layers of the ionosphere, the mobile receiver may experience an apparent delay in the GNSS signals. This delay is caused by refraction and diffraction and is a function of the electron density in the ionosphere layers. Electron density can be expressed in terms of Total Electron Count (TEC) values, more specifically, TEC units (TECUs). The electron density in the ionosphere above a given geographic region will vary over time and is influenced by solar activity.

BRIEF SUMMARY

Correction of errors in positioning measurements of GNSS signals, including errors attributed to ionospheric delay, is sometimes performed using information from an augmentation system. An augmentation system can be a satellite-based augmentation system (SBAS). Some augmentations systems are ground-based augmentation systems (GBAS). In an SBAS, one or more base stations on the ground (sometimes referred to as reference stations) perform measurements of signals from a satellite in a positioning system (e.g., a GNSS satellite). The measurements are used to calculate correction values for broadcast to end user devices (e.g., User Equipment or UEs), which are sometimes referred to as rovers. The broadcasting is usually performed via a satellite of the augmentation system. In a GBAS, reference receivers on the ground perform measurements in connection with calculating a correction value as a differential GPS correction, with the correction value being broadcast using a ground-based radio transmitter.

Augmentation data can be provided to a GNSS receiver (e.g., a UE/rover) from a ground-based entity such as a base station. In some instances, such as with an SBAS, the GNSS receiver may receive the augmentation data directly from a satellite. Augmentation data can include correction information relating to satellite orbit, clock error, ionospheric delay, and/or other error sources. Augmentation data relating to ionospheric delay can be generated based on a model of the ionosphere. Some ionosphere models reduce the various layers of the ionosphere to a single layer at a certain height above the earth. The augmentation data can be in the form of an ionosphere grid product containing TEC values for different points in a grid that represents a geographic region. In some instances, the grid covers the entire globe. In other instances, the grid only covers a local region (e.g., part of a continent). The grid points are typically expressed as latitude and longitude coordinates. The accuracy of the ionosphere models varies. For instance, augmentation data from the Klobuchar ionospheric model (a set of parameters broadcast as ephemeris data) is less accurate than information in an SBAS grid product or an International GNSS Service (IGS) global ionospheric map (GIM) grid product.

Availability of augmentation data generated using an ionosphere model also varies. Depending on the complexity of the ionosphere model, the amount of time used to calculate ionospheric delay values or values indicative thereof (e.g., TECUs) and/or the amount of time for a GNSS receiver to receive and decode such values can be substantial. Consequently, up-to-date ionospheric information that is relevant to the current location of a GNSS receiver may not always be available, and the GNSS receiver may have to wait until the next broadcast to receive newer, more relevant information. Further, a GNSS receiver may not always be in an environment that is conducive to successful decoding of ionospheric information. For example, if a UE is in an urban environment or other environment where satellite signals are weak or blocked, only part of the data for an ionosphere grid may be successfully decoded. Using a ground-based entity such as a reference or base station to rebroadcast the ionospheric information helps to a certain extent since a UE no longer has to rely solely on satellite transmission. However, rebroadcasting is subject to bandwidth constraints and availability of the communication network over which the ionospheric information is transmitted to the UE.

In order to improve the accuracy of position estimates determined based on correction of ionosphere error, certain aspects of the present disclosure relate to techniques that use historical ionospheric delay information in combination with current ionospheric delay information to estimate ionospheric delay. The historical ionospheric delay information can, for example, be in the form of TEC values from a prior measurement period. Prior TEC values can be relevant to a current measurement period because the electron density for a given geographic region tends to be similar at the same local time across a relatively short time span. For example, the TEC value at 3:00 am yesterday may be the same as, or similar to (e.g., within ten TECUs of), the TEC value at 3:00 am today. Further, because TEC values tend to vary in a similar manner across consecutive or shortly spaced apart days, historical TEC values can be used to identify a trend and extrapolate current TEC values. Thus, if a TEC value for the current measurement period is unavailable for some reason (e.g., the UE cannot receive or decode a signal from an augmentation system satellite or there is no base station nearby to rebroadcast ionosphere information), the UE can use the historical information to extrapolate a TEC value for the current measurement period. In this manner, the accuracy of a resulting position estimate can be improved compared to using non-historical information alone.

Certain aspects of the present disclosure relate to reducing the amount of ionosphere information that is transmitted to and/or stored by a GNSS receiver such as a UE. The amount of ionosphere information can be reduced through generating a compressed representation of an ionosphere grid product. In some implementations, the compressed representation includes coefficients of a spherical harmonic function. If the compressed representation is transmitted to a UE, the UE is more likely to be able to receive and successfully decode the compressed representation since less time is taken in transmitting the compressed representation, enabling the UE to have faster and/or more frequent access to relevant ionosphere information while reducing the risk that incomplete ionosphere information is received (e.g., due to interruption of signal reception). Additionally, compression prior to transmission to a UE reduces data traffic between the UE and the entity providing the compressed representation (e.g., a server of an augmentation system).

In certain aspects, compression of ionosphere information is performed by a UE based on ionosphere information that the UE receives (e.g., a grid product from an SBAS satellite). The compressed ionosphere information can be stored in a local memory of the UE as historical information for use in extrapolating a TEC value. Because the historical information is compressed, it can be stored more efficiently, using less memory. In this manner, a UE may generate its own historical information through saving "current" ionosphere information for later use, and without relying upon historical information subsequently being available from an external source, such as an augmentation system satellite or base station. Alternatively, historical ionosphere information can be transmitted to a UE in compressed form, which has similar benefits as transmitting a compressed representation of non-historical ionosphere information.

In certain aspects a method performed at a mobile device for correcting ionospheric error involves determining a positioning measurement of a GNSS signal. The method further involves obtaining augmentation data associated with historical TEC values, where the augmentation data was generated to represent ionospheric delay during a time period that ended before the augmentation data is obtained. The method further involves obtaining a pierce point of the GNSS signal and determining an ionospheric error in the positioning measurement of the GNSS signal based on the pierce point and the augmentation data.

In certain aspects, a mobile device includes a GNSS receiver configured to receive a GNSS signal from a navigation satellite. The mobile device further includes a wireless communication interface configured to communicate with an augmentation system. The mobile device further includes a memory and one or more processing units communicatively coupled with the GNSS receiver, the wireless communication interface, and the memory. The one or more processing units are configured to determine a positioning measurement of the GNSS signal and to obtain augmentation data associated with historical Total Electron Content (TEC) values, where the augmentation data was generated to represent ionospheric delay during a time period that ended before the augmentation data is obtained. The one or more processing units are further configured to obtain a pierce point of the GNSS signal and determine an ionospheric error in the positioning measurement of the GNSS signal based on the pierce point and the augmentation data.

In certain aspects, a non-transitory computer-readable medium has instructions stored thereon. When executed by one or more processing units of a mobile device, the instructions cause the one or more processing units to perform the following: determining a positioning measurement of a GNSS signal; obtaining augmentation data associated with historical Total Electron Content (TEC) values, where the augmentation data was generated to represent ionospheric delay during a time period that ended before the augmentation data is obtained; obtaining a pierce point of the GNSS signal; and determining an ionospheric error in the positioning measurement of the GNSS signal based on the pierce point and the augmentation data.

In certain aspects, a system includes a GNSS receiver configured to receive a GNSS signal from a navigation satellite. The system further includes a wireless communication interface configured to communicate with an augmentation system. The system further includes one or more processing units configured to determine a positioning measurement of the GNSS signal. The system further includes means for obtaining augmentation data associated with historical Total Electron Content (TEC) values, where the augmentation data was generated to represent ionospheric delay during a time period that ended before the augmentation data is obtained; means for obtaining a pierce point of the GNSS signal; and means for determining an ionospheric error in the positioning measurement of the GNSS signal based on the pierce point and the augmentation data.

BRIEF DESCRIPTION OF THE DRAWINGS

FIG. 5 is a flow diagram of a method for determining an ionospheric error in a positioning measurement of a GNSS signal according to an embodiment.

FIG. 7 illustrates a mathematical expression of a spherical harmonic function.

FIGS. 8 and 9 illustrate vectors usable for representing a spherical harmonic function.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While some embodiments in which one or more aspects of the disclosure may be implemented as described below, other embodiments may be used, and various modifications may be made without departing from the scope of the disclosure.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. RF signals transmitted from a Global Navigation Satellite System (GNSS) satellite are sometimes referred to herein as "GNSS signals."

Figure 1:
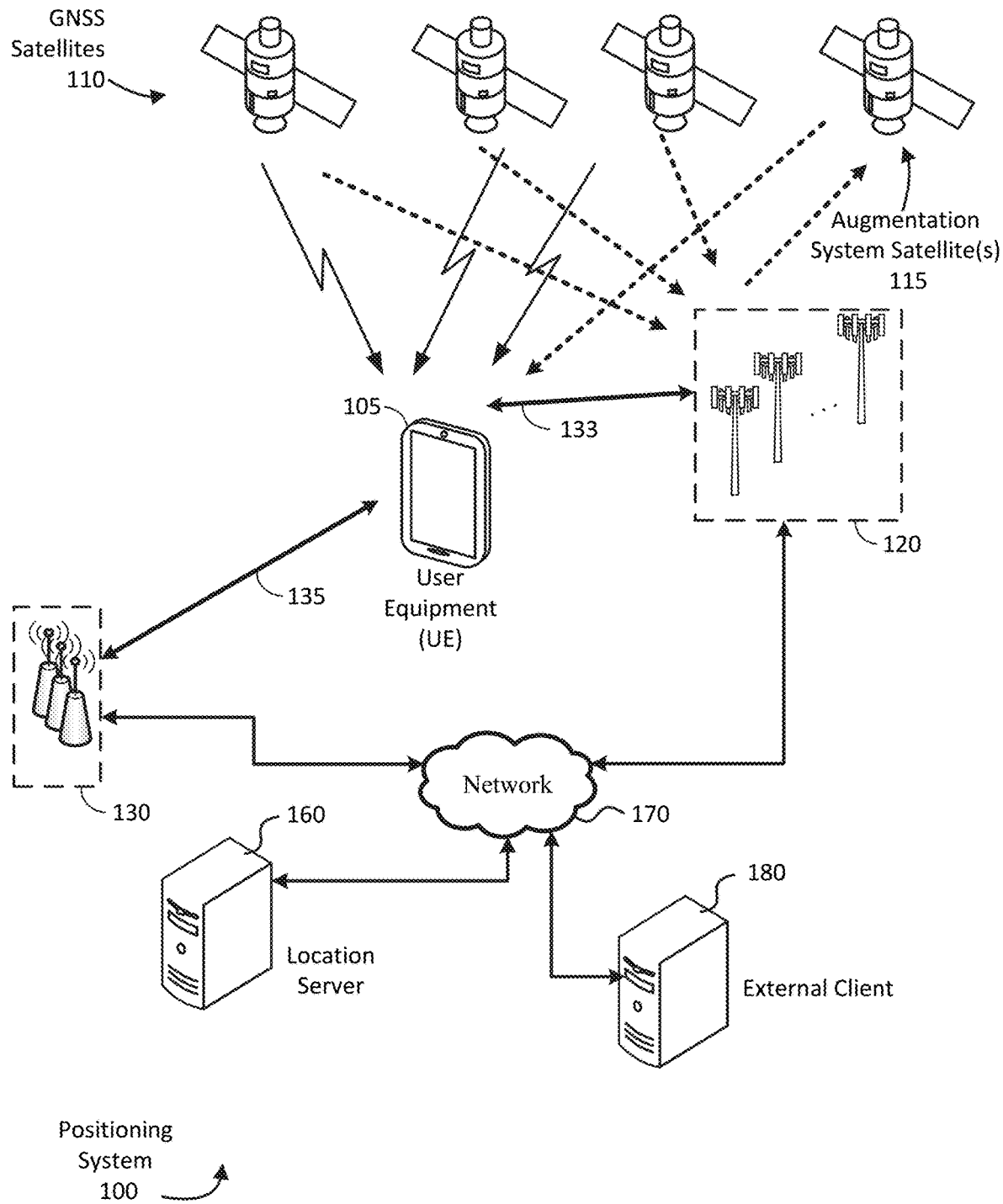
FIG. 1 is a diagram of a positioning system incorporating an augmentation system, according to an embodiment.

Embodiments described herein can be implemented using any positioning system in which a UE is communicatively coupled to one or more sources of augmentation data that includes information usable for correcting a measurement error caused by signal propagation through the ionosphere. An example of a positioning system suitable for implementing one or more embodiments is shown in FIG. 1. The positioning system in FIG. 1 is provided merely as an example and to illustrate how different entities can interact with a UE in connection with determining the location of the UE. In practice, a positioning system implemented according to an embodiment described herein may include more or fewer components than depicted in FIG. 1.

FIG. 1 is a simplified illustration of a positioning system 100 in which a UE 105, location server (LS) 160, and/or other components of the positioning system 100 can use the techniques provided herein for determining an estimated location of UE 105, according to an embodiment. The techniques described herein may be implemented by one or more components of the positioning system 100. The positioning system 100 can include a UE 105, one or more satellites 110 (also referred to as space vehicles (SVs)) for a GNSS such as the Global Positioning System (GPS), base stations 120, access points (APs) 130, LS 160, network 170, and external client 180. Generally, the positioning system 100 can estimate the location of the UE 105 based on RF signals received by and/or sent from the UE 105 and known locations of other components (e.g., GNSS satellites 110, base stations 120, APs 130) transmitting and/or receiving the RF signals.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that the network 170 is a 5G network. An AP 130 may comprise a Wi-Fi AP or a Bluetooth® AP, for example. Thus, UE 105 can send and receive information with network-connected devices, such as LS 160, by accessing the network 170 via a base station 120 using a first communication link 133. Additionally or alternatively, because APs 130 also may be communicatively coupled with the network 170, UE 105 may communicate with Internet-connected devices, including LS 160, using a second communication link 135.

As used herein, the term "base station" may generically refer to a single physical transmission point, or multiple co-located physical transmission points, which may be located at a base station 120. Physical transmission points may comprise an array of antennas (e.g., as in a Multiple Input-Multiple Output (MIMO) system and/or where the base station employs beamforming) of the base station. The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be a serving base station receiving a measurement report from the UE 105 and a neighbor base station whose reference RF signals the UE 105 is measuring.

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The LS 160 may comprise a server and/or other computing device configured to determine an estimated location of UE 105 and/or provide data (e.g., "assistance data") to UE 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE radio access by UE 105. The LS 160 may further comprise a Location Management Function (LMF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between LS 160 and UE 105 as data (e.g. data transported using the Internet Protocol (IP) and/or Transmission Control Protocol (TCP)) from the perspective of network 170.

As previously noted, the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. Moreover, in some embodiments, a location of the UE 105 is estimated at least in part based on measurements of RF signals communicated between the UE 105 and one or more other UEs (not shown in FIG. 1), which may be mobile. Direct communication between UEs in this manner may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may also be specified as a geodetic location (as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR, etc. The UE 105 may also support wireless communication to connect to other networks, such as the Internet.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

With a UE-assisted position method, UE 105 may obtain positioning measurements and send the measurements to a location server (e.g. LS 160) for computation of a location estimate for UE 105. Positioning measurements may include, for example, one or more of a Received Signal Strength Indication (RSSI), Round Trip signal propagation Time (RTT), Reference Signal Receive Power (RSRP), Reference Signal Received Quality (RSRQ), Time of Arrival (TOA), Reference Signal Time Difference (RSTD), AOA, Differential AOA (DAOA), AOD, or Timing Advance (TA). The positioning measurements may also or instead include measurements of RAT-independent position methods such as GNSS (e.g., GNSS pseudorange, GNSS code phase, and/or GNSS carrier phase for GNSS satellites 110), WLAN, etc.

With a UE-based position method, UE 105 may obtain positioning measurements (e.g., which may be the same as or similar to positioning measurements for a UE assisted position method) and may further compute a location of UE 105 (e.g., with the help of assistance data received from a location server such as LS 160). Further, in some instances, a UE-based position method may involve sidelink communication with another UE.

With a network based position method, one or more base stations, one or more APs, or some other entity connected to a network may obtain positioning measurements (e.g., measurements of RSSI, RTT, RSRP, RSRQ, AOA, or TOA) for signals transmitted by UE 105, and/or may receive measurements obtained by UE 105, and may send the measurements to a location server (e.g., LS 160) for computation of a location estimate for UE 105.

As shown in FIG. 1, the positioning system 100 may include one or more augmentation system satellites 115 (e.g., an SBAS satellite). In some instances, the satellites 115 may be operated by a different entity than an entity operating the GNSS satellites 110. Therefore, the augmentation system to which the satellite(s) 115 belong can be considered as separate system or, in some instances, a sub-system of the positioning system 100. To generate augmentation data, one or more reference stations (e.g., one or more of the base stations 120) may receive signals from the GNSS satellites 110. The signals received by the reference stations can be the same signals that are received by the UE 105. The reference stations may perform measurements using the GNSS satellite signals to compute one or more correction values, e.g., values indicative of ionospheric delay. The correction values may be transmitted from a reference station (or a master station in communication with multiple reference stations) to an augmentation system satellite 115 for transmission (e.g., broadcast) to the UE 105. Alternatively or additionally, the correction values may be transmitted to the UE 105 using ground-based infrastructure. For example, a correction message including one or more correction values can be sent to the UE 105 from a base station 120 via wireless link 133 or from an AP 130 via wireless link 135.

The correction values sent to the UE 105 include values usable for correcting one or more types of errors (e.g., satellite clock and orbit, ionospheric and tropospheric delays, phase wind-up, site displacement including solid earth tide, ocean loading, and/or pole tide). In some instances, the correction values are computed as differential corrections made using observations from a highly-accurate GNSS receiver at a reference location (e.g., a base station 120), and assuming the observations have effectively the same errors.

To be effective, the correction values should be supplied to the UE 105 relatively frequently, e.g., once every several minutes. However, in the case of ionosphere information, real-time correction values may not always be available depending on various factors such as the complexity of the ionosphere model used to compute the correction information and/or the amount of information to be transmitted. For example, WAAS-based ionospheric delay information can be transmitted in substantially real-time to the UE 105 (typically with a latency of approximately ten minutes) since the ionospheric delay information is regional (covering a 5 degree by 5 degree longitude grid ranging from −55 to 55 degrees latitude). In contrast, ionospheric delay information provided through an IGS GIM-based augmentation system has global coverage and is usually generated as a result of processing performed by hundreds of reference stations or more, so generating a complete ionosphere grid product can take hours or even days.

Figure 2:
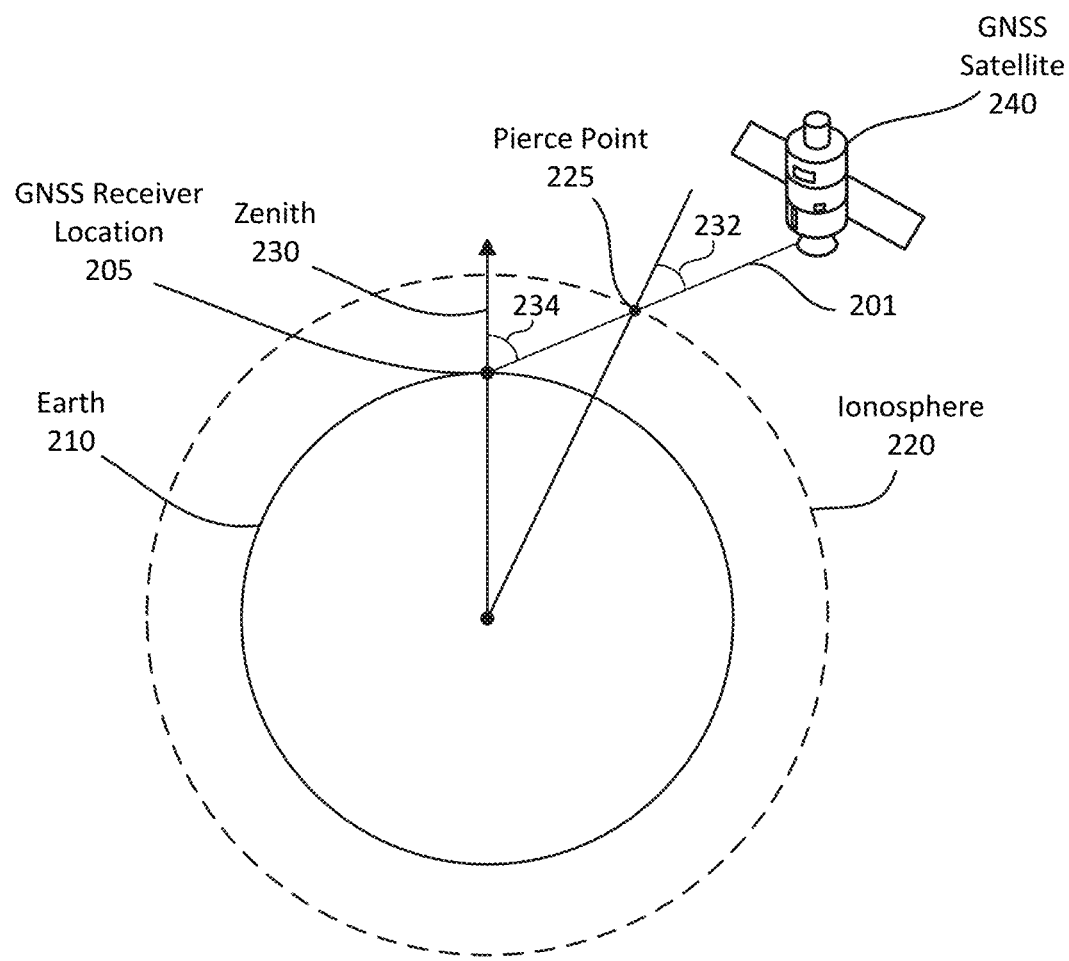
FIG. 2 illustrates a signal from a GNSS satellite propagating through the ionosphere to reach a GNSS receiver.

FIG. 2 illustrates a signal 201 transmitted from a GNSS satellite 240 (e.g., one of the GNSS satellites 110) to a GNSS receiver, for example, to a UE at a location 205 on the Earth 210. The signal 201 propagates through the ionosphere 220 before reaching the GNSS receiver. The ionosphere 220 can be modeled as a thin layer (a "thin-shell" model) located at a certain height (e.g., 350 kilometers) above the surface of the Earth 210. The signal 201 intersects with the ionosphere 220 at a pierce point 225. As shown in FIG. 2, the signal 201 reaches the ionosphere 220 at an angle 232 relative to a zenith direction 230 but arrives at the GNSS receiver at a zenith angle 234 that is usually different from the angle 232. The pierce point 225 can be calculated as a function of the location of the GNSS receiver, for example, based on the latitude, longitude, elevation angle, and azimuth angle of the UE, and the position of the GNSS satellite transmitting the GNSS signal (e.g., GNSS satellite 240).

Ionospheric delay information (e.g., in the form of an ionosphere grid product) can include a set of TEC values for different locations in a covered geographic region. Generally, the ionospheric delay relevant to the location of a GNSS receiver can be determined through looking up the TEC value at a specific grid location expressed in terms of a latitude-longitude pair. The grid location is not the location of the GNSS receiver itself (e.g., a position to be estimated), but rather the location of the pierce point 225. However, as discussed above, the pierce point can readily be calculated based on the location of the GNSS receiver. In the case of a UE, the approximate location of the UE (e.g., a last known or estimated position) may be sufficient for determining a corresponding pierce point. In some instances, the known location of a base station (e.g., a base station 120) or other network entity near the UE may be used for the purpose of determining the pierce point.

Figure 3:
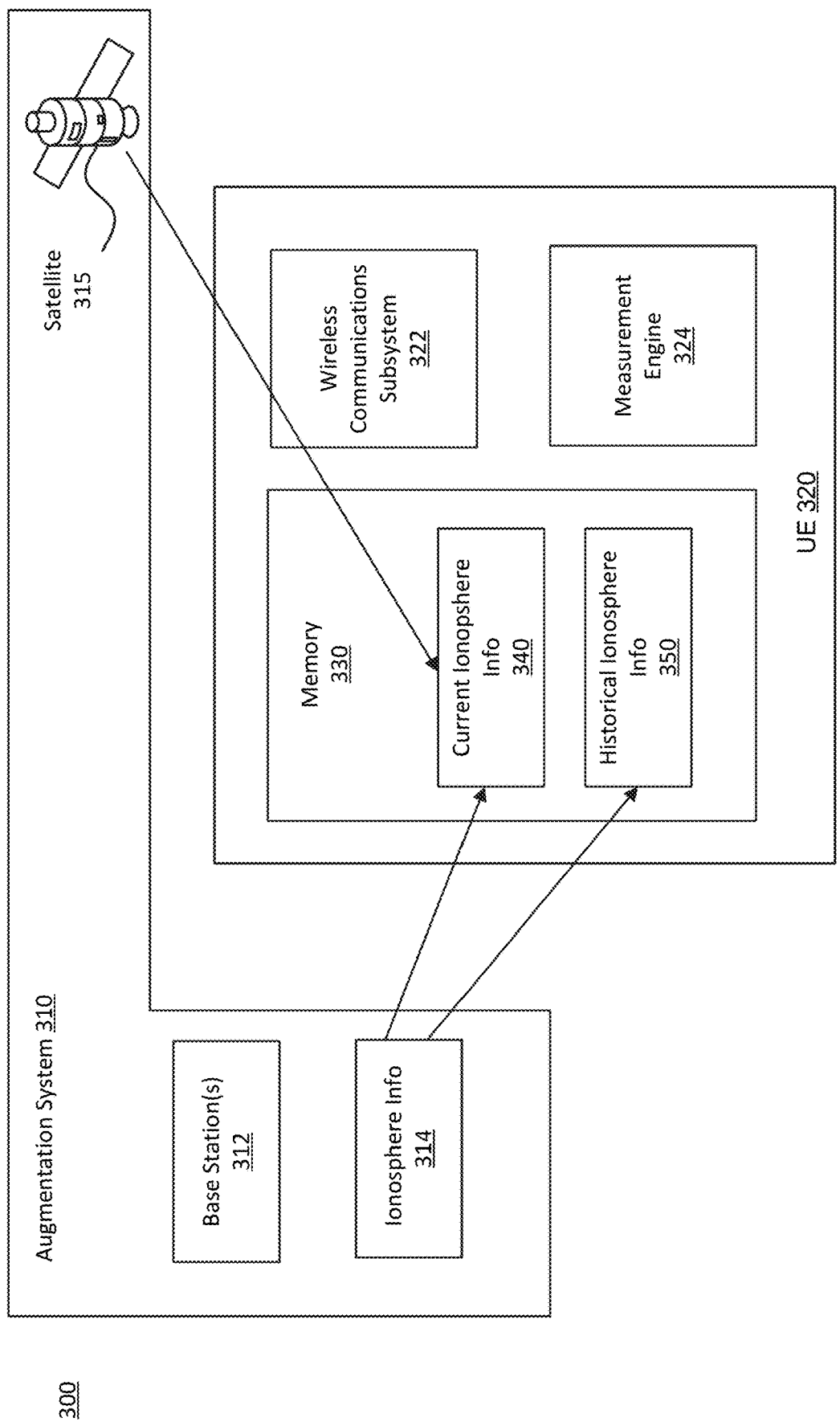
FIG. 3 is a simplified block diagram of a system according to an embodiment.

FIG. 3 is a simplified block diagram of a system 300 according to an embodiment. The system 300 includes an augmentation system 310, a satellite 315 that is part of the augmentation system 310 (e.g., an augmentation system satellite 115), and a UE 320. The system 300 in FIG. 3 is provided merely as an example and to illustrate how a GNSS receiver such as UE 320 can receive, in accordance with the techniques described herein, ionospheric delay information from an augmentation system. In practice, a system implemented according to an embodiment described herein may include more or fewer components than depicted in FIG. 3.

As shown in FIG. 3, augmentation system 310 may include one or more base stations 312 and is configured to maintain ionosphere information 314. The base station(s) 312 may correspond to base stations 120 in FIG. 1 and are configured to generate the ionosphere information 314 based on measurements of GNSS satellite signals (e.g., signals transmitted by GNSS satellites 110). The base station(s) 312 may be configured to generate, for inclusion in the ionosphere information 314, one or more sets of grid values, each set of grid values corresponding to a "snapshot" of the ionosphere above one or more geographic regions at a specific point in time. The grid values are values that are indicative of ionospheric delay (e.g., TEC values or values derived from TEC values) and can be computed based on measurements of GNSS satellite signals as performed by at least one base station 312. TEC values are usually provided as vertical TEC values, which are calculated through integration along a vertical path in the zenith direction of an observer (e.g., a base station 312). Some implementations may use slant TEC values instead of vertical TEC. Slant TEC values are computed through integration along the path of travel from a GNSS satellite to an observer. In practice, vertical TEC would tend to be used more frequently since slant TEC is dependent on azimuth and elevation angle, so there are multiple slant TEC values to compute per pierce point. In most instances, correction of ionospheric delay can be adequately performed using vertical TEC, for which there is just a single value per pierce point.

Ionosphere information 314 can include current ionosphere information, that is, information pertaining to the ionospheric delay for a current measurement period of the UE 320. In this respect, current ionosphere information may correspond to the most recent grid product generated by augmentation system 310. Additionally or alternatively, the ionosphere information 314 can include historical information pertaining to the ionospheric delay for a prior measurement period. As discussed above, the frequency with which ionospheric delay information becomes available can vary. For example, if the ionosphere information 314 includes an SBAS grid product, the SBAS grid product may be computed using measurements performed by the base station(s) 312 and transmitted to the UE 320 in substantially real-time (e.g., every ten minutes) so as to be relevant for a current measurement period. In some instances, the ionosphere information 314 may include an IGS GIM grid product that is computed every few hours or days, based on measurements performed by the base stations 312. Accordingly, in some embodiments, the ionosphere information 314 may be stored using multiple databases, where each database maintains ionospheric delay information derived from a separate source. For example, the augmentation system 310 can include a first database for storing SBAS grid products and a second database for storing IGS GIM grid products.

UE 320 may include a wireless communications subsystem 322, a measurement engine 324, and a memory 330. The wireless communication subsystem 322 can include one or more wireless receivers configured to communicate with the augmentation system 310. For example, wireless communication subsystem 322 may communicatively couple the UE 320 to one or more base stations 312, to a server (not shown) that maintains a database storing the ionosphere information 314, and/or to the satellite 315. Further, the wireless communication subsystem can include one or more GNSS receivers configured to receive signals from GNSS satellites (e.g., GNSS satellites 110) in connection with performing a positioning operation using measurements of the signals from the GNSS satellites.

The measurement engine 324 can be implemented in hardware and/or software and is configured to perform measurements of GNSS signals in connection with a positioning operation. As discussed above in connection with FIG. 1, various position methods exist including UE-based, UE-assisted, and network-based position methods. Depending on which of these types of position methods the UE has been configured to support, the measurement engine 324 may obtain one or more types of measurements for each GNSS signal transmitted by a constellation of GNSS satellites. The measurements can be used to estimate the position of the UE 320 locally or, alternatively, transmitted to an external entity for estimating the UE's position remotely.

The measurement engine 324 can be configured to correct the measurements that it performs, using ionosphere information received by the UE 320, possibly together with other types of correction information that the UE 320 receives from the augmentation system 310, for example, clock bias correction information, orbital correction information for a GNSS satellite, and the like. As shown in FIG. 3, the ionosphere information received by the UE may be stored in memory 330 and can include current ionosphere information 340 and historical ionosphere information 350.

Memory 330 may include one or more types of memory devices, including volatile and/or non-volatile storage memory. In the case of historical ionosphere information 350, the information may be stored in non-volatile memory so that the information 350 can be subsequently retrieved even if the UE 320 is powered off temporarily. In some implementations, the current ionosphere information 340 can be maintained in a storage buffer, e.g., in working memory, and transferred to another portion of memory 330 for storage as historical ionosphere information 350. Additionally, in some implementations, at least some of the ionosphere information in the system 300 (e.g., the ionosphere information 314 and/or the ionosphere information in the memory 330 of the UE 320) may be stored in compressed form. Example compression techniques are described below in connection with FIGS. 6-9.

Current ionosphere information 340 can include any information that is indicative of the degree of error in a measurement of a GNSS signal, where the error is a result of the GNSS signal propagating through the ionosphere. For example, as discussed above, information regarding ionospheric delay can be provided in the form of an ionosphere grid product that includes TEC values for different points in a grid representing a geographic region or, more specifically, the ionosphere above the geographic region. Thus, the information 340 may be in the form of a lookup table containing TEC values indexed according to latitude and longitude coordinates, where the latitude and longitude coordinates correspond to possible pierce points. The information 340 can be used to estimate the delay that a GNSS signal encounters as a result of propagating through the ionosphere. Alternatively or additionally, in some implementations, the information 340 may include delay correction values that are derived from TEC values. Such correction values may be satellite specific and/or frequency specific. For example, if the position of the UE 320 is to be estimated based on measurements of GNSS signals transmitted on the L1 frequency band in addition to measurements of GNSS signals transmitted on the L2 frequency band, the information 340 may include correction values for L1 signals and separate correction values for L2 signals. In some implementations, ionospheric delay information stored either as grid values or as correction values specific to a satellite and for a specific frequency band (e.g., L1) can also be used to correct measurements on a different frequency (e.g., L2) with appropriate scaling to account for the difference in frequency.

The information 340 corresponds to a first subset of the ionosphere information 314 maintained by the augmentation system 310 and is current in that it is relevant to a measurement period covering the duration in which a set of GNSS signals are received and decoded by the UE 320 for obtaining one or more types of measurements in connection with estimating the current position of the UE 320. Thus, the information 340 represents the delay experienced by GNSS signals received during a current measurement period. The length of the measurement period may depend on the configuration of the UE, and different UEs may be configured with different measurement periods. The information 340 can be transmitted to the UE 320 via satellite (e.g., satellite 315) and/or through a ground-based component of the augmentation system 310, for example, a base station 312 or a server that maintains the ionosphere information 314. In some implementations, the information 340 may correspond to an SBAS grid product.

Historical ionosphere information 350 corresponds to a second subset of the ionosphere information 314 maintained by the augmentation system 310 and includes delay information that is relevant to one or more measurement periods prior to the current measurement period. The information 350 can be an older version of the information 340. For example, after receiving the information 340, the UE 320 may store the information 340 as historical ionosphere information 350 for later use. Alternatively, the information 340 can be collected by the augmentation system (e.g., concurrently with transmission of the information 340 to the UE) and stored in a database before being sent to the UE as historical information. For instance, the augmentation system 310 may be configured to collect ionosphere information over multiple measurement periods for transmission to UE in a single batch as historical ionosphere information 350. Thus, the information 350 can eventually be updated to include the same values as the information 340 but is not necessarily the same as what was received by the UE as current ionosphere information. In some implementations, the information 350 may correspond to an IGS GIM grid product.

FIG. 3 depicts the information 350 as being transmitted from the augmentation system 310 to the UE 320 as historical information. In some instances (e.g., when using an IGS GIM model) this may be due to the relatively slow rate at which the information 350 becomes available. However, as indicated above, the UE 320 may generate its own historical information based on current ionosphere information 340. For example, in some implementations, the historical information 350 may include historical GIM grid values and historical SBAS grid values, where the historical GIM grid values are transmitted to the UE by a server of the augmentation system 310 and the historical SBAS grid values are locally generated copies of SBAS grid values that were received as current ionosphere information 340.

Figure 4B:
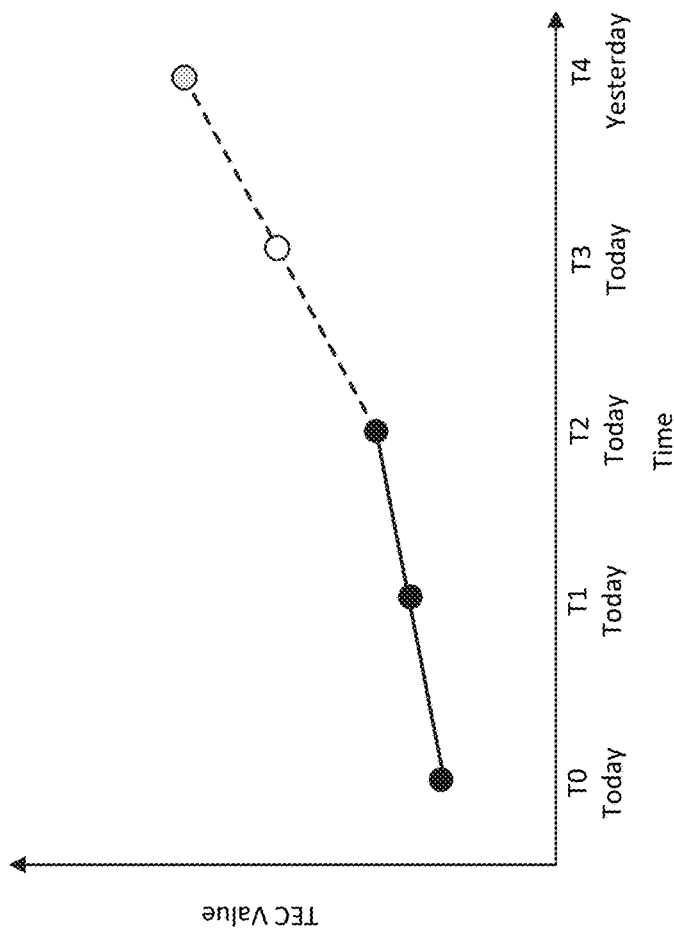
FIGS. 4A and 4B are timing diagrams illustrating different techniques for extrapolating a current TEC value according to some embodiments.
Figure 4A:
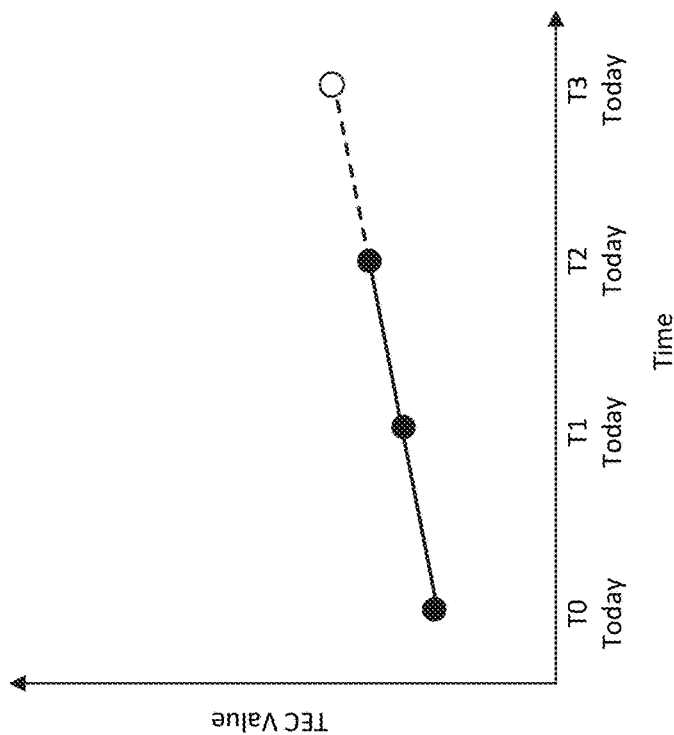

FIGS. 4A and 4B are timing diagrams illustrating different techniques for extrapolating a current TEC value. Although the data points shown in FIGS. 4A and 4B are TEC values, the extrapolation techniques can be applied to any information indicative of ionospheric delay (e.g., correction values derived from TEC values). In FIG. 4A, a UE receives (e.g., as current ionosphere information 340 in FIG. 3) and successfully decodes TEC values for each of times T0, T1, and T2. Times T0 to T2 may correspond to any arbitrary sequence of time points, for example, three different times during a single day, as shown in the figure. Sometime between T2 and the next time point T3, the UE stops receiving or is unable to successfully decode TEC values so that a current TEC value from the latest set of grid values that can be potentially transmitted to the UE from an augmentation system becomes unavailable for T3. To determine the TEC value for T3 and/or the TEC value for any time between T2 and T3, the UE may perform an extrapolation operation using the TEC values at T0 to T2. The extrapolation operation may involve, for example, fitting a line, a curve, a piecewise polynomial, or some other mathematical function through each of the TEC values at T0, T1, and T2 and extending the line or curve to T3, as shown in FIG. 4A.

The technique illustrated in FIG. 4A involves TEC values that were obtained in the recent past. In this regard, although the TEC values at T0 to T2 are for time points earlier than the TEC value at T3, the TEC values at T0 to T2 can be used to extrapolate an ionospherical delay for T3 in the current measurement period. In the examples of FIGS. 4A and 4B, a measurement period may span a period within a single day (e.g., a window of ten minutes). Typically, T0 to T2 would be time points that are separated by a few minutes from one time point to the next (e.g., two minutes apart), but the time separation between data points can be longer or shorter. For example, T0 and T1 could be one hour apart. Thus, one method of extrapolating a missing TEC value for a current measurement period is to use two or more TEC values from the current measurement period or, in general, any measurement period that the most recent set of grid values received from an augmentation system is valid for. Although the extrapolation technique illustrated in FIG. 4A is relatively simple to implement, without historical information spanning a longer time period (e.g., a previous day, multiple days in the past, or some other period covered by an older set of grid values), this technique does not account for periodic variations that can be expected, for example, variations over the course of a single day as expected based on similar variations during another day. Therefore, the technique of FIG. 4A does not always provide optimal performance. A more accurate but also more complex extrapolation technique is shown in FIG. 4B.

FIG. 4B illustrates an example of extrapolating a TEC value using a historical TEC value. Given the tendency for TEC values to repeat between consecutive or shortly spaced apart days, a trend in TEC values for a current measurement period can be identified based on TEC values from a prior measurement period, for example, a measurement period corresponding to a previous day or, in general, any measurement period covered by an older set of grid values. In this respect, historical ionosphere information can include TEC values that are old enough to establish a trend in the way TEC values changed previously as being the same as or substantially similar to the way in which TEC values are changing currently. For example, TEC values from yesterday, two days ago, or even one week ago may be indicative of how the TEC values are changing in the present day. As shown in FIG. 4B, the TEC value at T3 (e.g., 3:00 am) today can be determined using a TEC value at T4 (e.g., 4:00 am) yesterday. Alternatively or additionally, a TEC value at T3 yesterday may be used. For example, instead of fitting a line or curve through only the data points at T0 to T2, the fitting can be performed using the data points at T0 to T2 (or a subset thereof) in combination with the data points at T3 yesterday and T4 yesterday (or a subset thereof). The resulting value extrapolated for T3 using the technique of FIG. 4B can be expected to be closer to the actual TEC value at T3 today than the extrapolated value in FIG. 4A.

In some implementations, the value extrapolated is a weighted sum of: (1) TEC values observed during a prior measurement period or period covered by an older set of grid values (e.g., T0 to T4 yesterday) and/or (2) TEC values observed during a current measurement period or period covered by the latest set of grid values (e.g., T0 to T2 today). The example described with respect to FIG. 4B uses both (1) and (2). In contrast, FIG. 4A is an example of extrapolation using only (2). Each of the TEC values used to perform the extrapolation may have a respective weighting factor that scales the TEC value up or down, with the sum of all the weighting factors being set to a certain value, e.g., a value of one. Thus, one method of extrapolating a missing TEC value for a current measurement period is to use one or more TEC values from a prior measurement period in combination with one or more TEC values from the current measurement period.

As an alternative to the extrapolation techniques illustrated in FIGS. 4A and 4B, a faster but potentially less accurate option for determining a missing TEC value for a current measurement period is to simply substitute a TEC value from a prior measurement period or period covered by an older set of grid values for the missing TEC value. For example, the TEC value at T3 yesterday can be assumed to be the same as the TEC value at T3 today. This alternative approach can be viewed as being a special case of the weighted sum approach described above, where full weight (e.g., a weighting factor of one) is applied to a TEC value observed in a prior measurement period or period covered by an older set of grid values. In summary, extrapolation can be based on current values (values associated with the current measurement period or most recent set of grid values), historical values (values associated with a prior measurement period or period covered by an older set of grid values), or a combination of both current and historical values.

Figure 11:
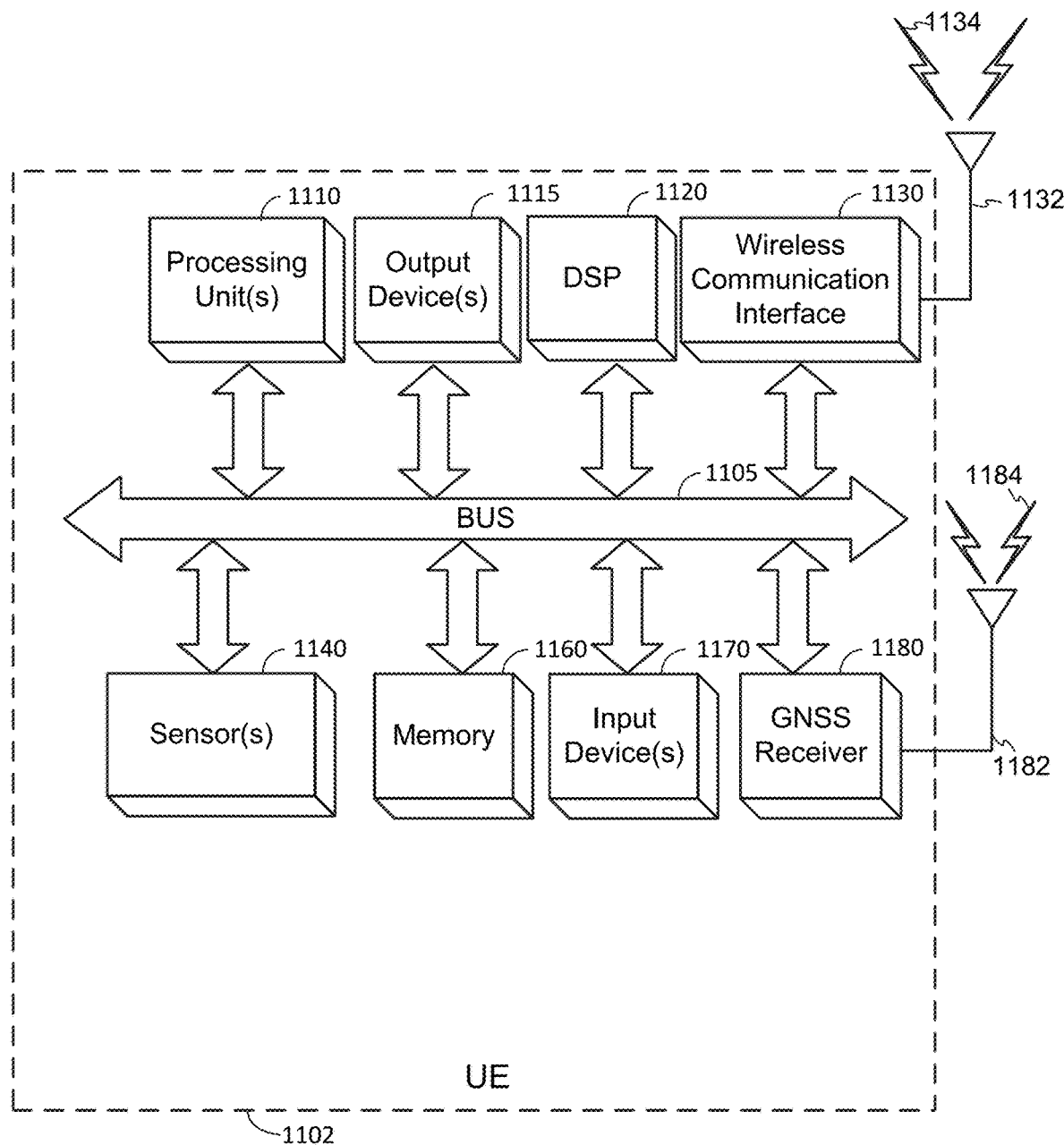
FIG. 11 illustrates an embodiment of a UE, which can be utilized in embodiments described herein.

FIG. 5 is a flow diagram of a method 500 for determining an ionospheric error in a positioning measurement of a GNSS signal, according to an embodiment. Means for performing the functionality illustrated in FIG. 5 may be performed by hardware and/or software components of a mobile device equipped with a GNSS receiver (e.g., one or more processors of a UE). Example components of a UE are illustrated in FIG. 11, which is described in more detail below.

At 502, a positioning measurement of a GNSS signal is determined. The GNSS signal for which the positioning measurement is determined can be a GNSS signal received by the UE during a current measurement period. In addition to the GNSS signal, the UE may be configured to receive augmentation data from an augmentation system, e.g., non-historical augmentation data relevant to the current measurement period. In some instances, no augmentation data whatsoever is available that is relevant to the current measurement period. This may occur, for example, when a server of an augmentation system is offline or there is no signal from a satellite of the augmentation system or the signal from a satellite of the augmentation system is blocked from the location of UE. In other instances, the UE may receive a partial set of non-historical augmentation data. When non-historical augmentation data (e.g., augmentation data for a current measurement period) is unavailable, ionospheric error can be determined based on historical augmentation data, for example, in accordance with the functionality in blocks 504, 506, and 508 discussed below.

At 504, augmentation data associated with TEC values during one or more prior measurement periods (e.g., TECUs during one or more days in the past) is obtained. The obtaining of the augmentation data in 504 can, in some instances, be performed in response to a determination that augmentation data for a current measurement period is unavailable (e.g., determining that the TEC value for T3 is unavailable, as discussed above in connection with the example of FIGS. 4A and 4B). Further, the augmentation data obtained in 504 can include TEC values for different locations, for example, different points in an ionosphere grid representing a map of the ionosphere above one or more geographic regions.

The augmentation data obtained in 504 can be self-generated by the UE or communicated to the UE from an augmentation system such as the augmentation system 310 in FIG. 3. Thus, in some implementations, the functionality in block 504 involves retrieving historical TEC values from a memory of the UE. In some implementations, the augmentation data obtained in block 504 is data obtained from one or more SBAS satellites (e.g., transmitted during a current measurement period from one or more WAAS satellites). In other implementations, the augmentation data obtained in 504 can be from one or more remote/network entities (e.g., a server of an augmentation system) and may correspond to data generated using an IGM GIM model of the ionosphere. Further, in some implementations, the augmentation data obtained in 504 may correspond to a compressed representation of augmentation data (e.g., a compressed representation of an SBAS or IGG GIM grid). An example of a method for compressing augmentation data for use as historical augmentation data is described below in connection with FIG. 6.

As an alternative to obtaining TEC values, in some implementations the augmentation data obtained in block 504 is data representing a computer-executable model, where the model is configured to compute the ionospheric delay and/or a corresponding correction value for a particular point in time and at a particular location (e.g., a time in the current measurement period, at a location corresponding to a pierce point of the GNSS signal). The model can be an algorithmic model or a machine learning (ML) model and can be generated using historical augmentation data. For example, an ML model can be trained to estimate ionospheric delay, using historical augmentation data (e.g., historical TEC values) as training data. Training of the ML model may, for instance, involve adjusting weights of a neural network, using back-propagation based on the difference between an actual ionospheric delay value and an ionospheric delay value estimated by the neural network based on an input time and an input location, where the actual ionospheric delay value is a known value for a given set of historical augmentation data. Accordingly, the augmentation data obtained in block 504 can include one or more parameters of an ML model (e.g., weights of a neural network) or, in general, any set of one or more parameters for a computer-executable model that was generated based on historical augmentation data. Such parameters may be communicated to the UE from a server or other component of an augmentation system. Alternatively, the UE could determine the parameters of the model for itself based on historical augmentation data that the UE has received. Thus, TEC values covering one or more prior measurement periods do not have to be used directly for determining ionospheric delay. At 506, a pierce point of the GNSS signal is obtained. The pierce point in 506 corresponds to an ionosphere location that the GNSS signal passed through before the GNSS signal was received by the UE. As described above in connection with FIG. 2, pierce points can be calculated as a function of a location of a UE or a nearby entity in communication with the UE, for example, a base station, and the position of the GNSS satellite transmitting the GNSS signal. The pierce point can be determined by the UE, for example, based on knowledge of the UE's own approximate position and the position of the GNSS satellite. Alternatively, the pierce point can be computed by a remote or network entity, e.g., a base station or server of the augmentation system, and communicated to the UE from the remote/network entity.

At 508, an ionospheric error in the positioning measurement of the GNSS signal is determined based on the pierce point obtained in block 506 and the augmentation data obtained in block 504. For example, the determination in block 508 may involve identifying a TEC value for the pierce point or, more specifically, for a set of grid points that surround the pierce point. For instance, if the augmentation data is stored in the form of a lookup table, the latitude and longitude coordinates of the four grid points that correspond to the corners of a grid cell surrounding the pierce point (e.g., a square or rectangular box spanning a certain number of degrees latitude and longitude) can be used to look up a TEC value at each of those coordinates. The TEC value that is identified can be a value for a prior measurement period, which can be any measurement period before the current measurement period or, in general, any measurement period covered by augmentation data older than non-historical augmentation data that should have been available. For example, a historical TEC value can be a TEC value from yesterday, the day before yesterday, last week, or the like.

As part of the functionality in block 508, a trend can be computed for each of the four grid points surrounding the pierce point, e.g., using the historic values at the four grid points to estimate the TEC value applicable for the pierce point in the current measurement period. These estimated TECs at the grid points can then be used to extrapolate a TEC value applicable for the same pierce point but at a current time. For example, a separate TEC value can be extrapolated for each of the four grid points (using any of the extrapolation methods described above) and a TEC value can be computed for the pierce point as an average or weighted average of the four extrapolated values. In some instances, fewer than four grid points may be used for extrapolation of a TEC value for the pierce point. For example, a single grid point may be sufficient for determining the TEC value for the pierce point when the coordinates of the pierce point are an exact match to the coordinates of the grid point.

Using the TEC value for the pierce point, the ionospheric delay (and thus the ionospheric error) can be determined. For example, the ionospheric delay can be computed as a multiplication product of the TEC value for the pierce point and a scale factor that depends on the carrier frequency of the GNSS signal. Alternatively, as described above, the ionospheric delay can be determined by inputting the pierce point and the current time into a computer model that has been generated using historical augmentation data so that the ionospheric error is determined without directly using historical TEC values.

At 510, the ionospheric error in the positioning measurement of the GNSS signal is optionally corrected using the ionospheric error determined in block 508. The correction may involve adjusting a value of the positioning measurement taking into account the ionospheric error. Accordingly, the UE can correct the ionospheric error even though the UE may not have received one or more TEC values that are relevant for the current measurement period. The adjusting of the value of the positioning measurement can be performed by the UE itself, for example, prior to sending a corrected positioning measurement to a location server that computes the location of the UE using the corrected positioning measurement. Alternatively, the correction in 510 may involve transmitting the positioning measurement to the location server or other remote/network entity together with the TEC value identified in 508 and/or the TEC value extrapolated using the TEC value in 508 to enable the remote/network entity to compute and apply the correction value.

Figure 6:
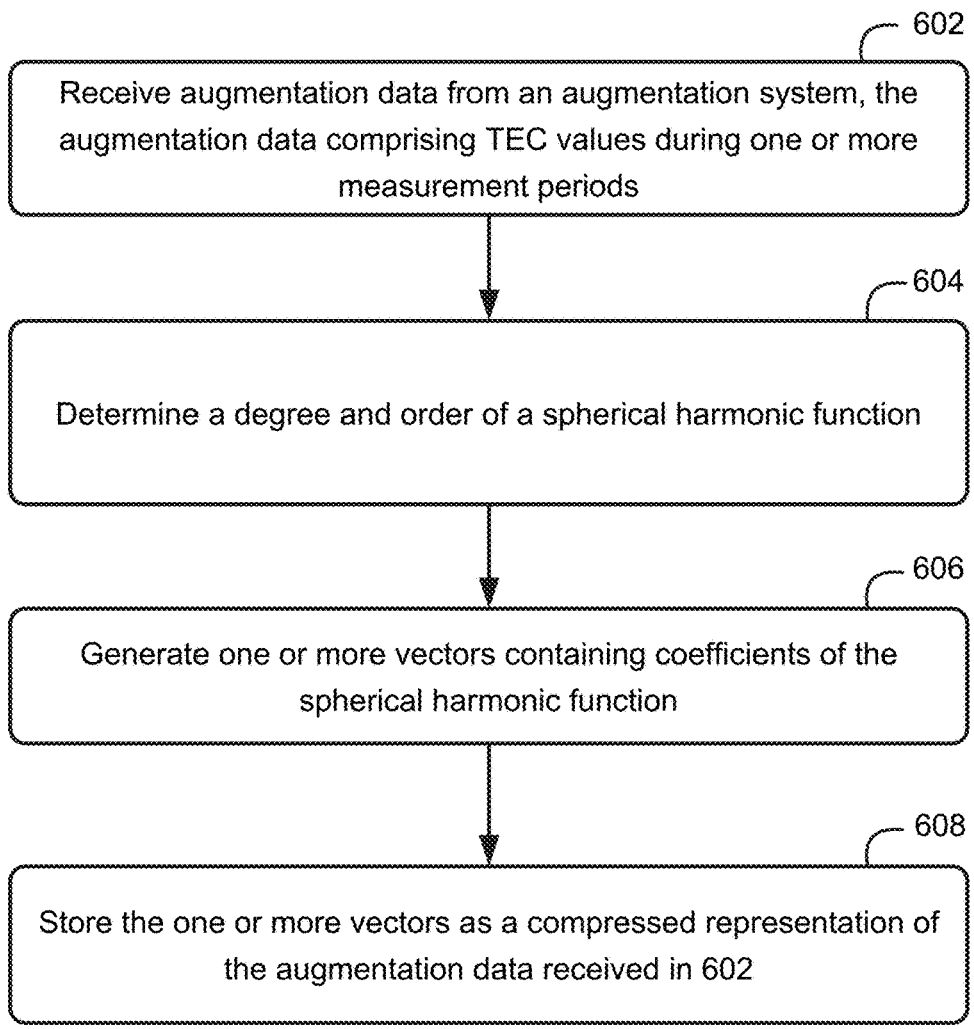
FIG. 6 is a flow diagram of a method for compressing augmentation data based on a spherical harmonic function, according to an embodiment.

FIG. 6 is a flow diagram of a method 600 for compressing augmentation data, e.g., for use as historical augmentation data, according to an embodiment. Means for performing the functionality illustrated in FIG. 6 may be performed by hardware and/or software components of a mobile device equipped with a GNSS receiver (e.g., one or more processors of a UE). Example components of a UE are illustrated in FIG. 11, which is described in more detail below.

At 602, augmentation data is received from an augmentation system. The augmentation data received in block 602 includes TEC values during one or more periods (e.g., a TEC value for a geographic region in which the UE is currently located and covering a current measurement period). For example, the augmentation data in 602 may include a set of TEC values for different points in a grid representing the ionosphere above one or more geographic regions, where the grid values are generated according to a model of the ionosphere (e.g., an SBAS model), are transmitted via a satellite of the augmentation system (e.g., the satellite 315 in FIG. 3), and are expected to be valid (indicative of actual ionospheric delay) for a certain duration covering the current measurement period. In some instances, the augmentation data in 602 may be received from a ground-based component of the augmentation system, for example, a server or a base station. The augmentation data can be received as part of a periodic broadcast of such data.

At 604, a degree (n) and an order (m) of a spherical harmonic function are determined for the grid. As indicated above, a grid represents a snapshot of the ionosphere at a specific point in time. Multiple grids may be available to cover multiple time periods, geographic regions and/or broadcasts from different augmentation systems. When compressing a grid, degree n and order m can be determined for each snapshot separately to optimally represent the data. In some implementations, TEC values from a snapshot can be further divided into geographic regions to allow higher compression in regions with low ionospheric activity (low TEC variation across grid points) and higher precision in regions with high ionospheric activity (high TEC variation between grid points). The general form of a spherical harmonic function is:

$$f(\theta, \varphi) = \sum_{n=0}^{\infty} \sum_{m=0}^{n} \{[A_n^m * \cos(m\varphi) + B_n^m * \sin(m\varphi)] * P_n^m(\cos\theta)\} \quad (1)$$

where $\theta$ is co-latitude and has a value from 0 to $\pi$, $\varphi$ is longitude and has a value from 0 to $2\pi$, $A_n^m$ and $B_n^m$ are coefficients whose values are to be determined and which determine the shape of the spherical function, and $P_n^m(\cos\theta)$ is Legendre's function (a function represented by an associated Legendre polynomial). The coefficients $A_n^m$ and $B_n^m$ can be determined by the augmentation system and communicated to the UE. Alternatively, the coefficients can be determined by the UE based on grid values received from the augmentation system (e.g., the augmentation data received in 602). Here, the value of the function $f(\theta, \varphi)$ is a TEC value. Thus, the latitude and longitude coordinates of a pierce point can be provided as input to the function $f(\theta, \varphi)$ to determine the TEC value at the pierce point. In some implementations, the TEC values for each possible pierce point in one or more geographic regions are pre-computed and stored in memory, e.g., in a lookup table. Alternatively, a UE may be configured to compute TEC values on-the-fly using the coordinates of a pierce point as input to the function $f(\theta, \varphi)$.

The general form in Equation 1 above can be expressed in terms of the degree n and the order m of the spherical harmonic function as follows:

$$f(\theta, \varphi) = \sum_{n=0}^{N} \sum_{m=0}^{min(n,m)} \{[A_n^m * \cos(m\varphi) + B_n^m * \sin(m\varphi)] * P_n^m(\cos\theta)\} \quad (2)$$

where min(n,m) is a function that determines the lowest value among several inputs, in this case whichever of n and m is lower.

The order m is typically lower than the degree n, in which case Equation 2 can be expanded into the expression shown in FIG. 7. Further, the expression in FIG. 7 can be simplified as a product between two vectors:

$$f(\theta, \varphi) = X * C \quad (3)$$

where X is a coefficient vector containing coefficients whose values are to be estimated and C is a scale vector.

FIG. 8 illustrates the general form of the coefficient vector X. FIG. 9 illustrates the general form of the scale vector C. As shown in FIG. 8, the coefficient vector X comprises a set of coefficients whose values are independent of latitude and longitude. In contrast, as shown in FIG. 9, the scale vector (comprises a set of coefficients whose values are a function of latitude and longitude. Accordingly, in some embodiments, the vector product form of the spherical harmonic function in Equation 3 may be communicated to a UE by the augmentation system, e.g., as a set of coefficients representing the coefficient vector X and a set of coefficients representing the scale vector C. Alternatively, the UE may generate the vector product form of the spherical harmonic function based on selection of the parameters n and m, e.g., in connection with performing the functionality in block 604 of FIG. 6.

Returning to block 604 of FIG. 6, as discussed above the degree n and/or the order m may be determined based on the variation in TEC values at each geographic region. Thus, n or m may be different between a first geographic region and a second geographic region. In effect, this results in spherical harmonic coefficients are region specific. This technique of providing disparate treatment for different regions can be applied to achieve a varying level of compression for the TEC values in different locations. In addition, the degree and/or order of spherical harmonic function(s) representing a given geographic region can be changed over time in order to achieve varying levels of compression in correspondence with change in ionospheric activity at the region over time. Thus, the degree and/or order used to generate a compressed snapshot for one set of grid values may be different from the degree and/or used to compress another set of grid values received for a later time.

From FIGS. 8 and 9, it can be seen that the sizes of the vectors X and C are dependent on the values of n and m. As n or m increase, so does the vector size. Conversely, vector size decreases with decreasing n or m. For example, for n=12 and m=10, the size of each vector is 163 data elements. For n=16 and m=12, the size is 269 elements. By selecting n and m based on the variation in TEC level for a geographic region, a level of compression appropriate for accurate representation of the TEC value can be achieved. For example, during times or in locations where the ionosphere is relatively active, the difference between the TEC values at adjacent or neighboring grid points (e.g., any pair of grid points belonging to the same cell) tends to be higher, whereas the TEC values for adjacent/neighboring grid points tend to be more uniform when the ionosphere is quiet. Accordingly, when there is a large fluctuation in TEC value across grid points (or a geographic region in general), a higher degree and/or order can be selected to more accurately capture the effects of the ionosphere. When the value of n and/or the value of m is selected to be larger, this results in less compression but a more accurate representation, and therefore a more accurate computation of ionospheric delay. Similarly, smaller values of n and/or m can be selected during times or in geographic regions were the ionosphere is relatively quiet (e.g., maximum difference in TEC value across grid points or average difference in TEC value across grid points below a certain threshold), resulting in more compression but a less accurate representation. With appropriate selection of n and m, the accuracy with which the position of the UE is estimated will be relatively unaffected since the impact of ionospheric delay is less when the ionosphere is relatively quiet.

At 606, one or more vectors containing coefficients of the spherical harmonic function are generated. For instance, a vector generated in 606 may be the coefficient vector X or the scale vector C described above. In some implementations, both the vector X and the vector C are generated by the augmentation system and communicated to the UE for use as historical data. Alternatively, the augmentation system may send the vector X to the UE without sending the vector C, and the UE may determine the values for the vector C for itself since the UE can be configured with information about the associated Legendre polynomials from which the values of the vector C are derived. In such implementations, the functionality in block 604 may be performed by the augmentation system instead of the UE. As yet another option, the UE may generate both the vector X and the vector C for its own use, e.g., based on the TEC values received in 602. That is, instead of relying on the augmentation system to deliver the compressed augmentation data, the UE can generate compressed forms of augmentation data that it receives and store the compressed augmentation data for later use as historical data.

Additionally, in some implementations, compression of augmentation data may involve using a mix of data types to represent the compressed form of the augmentation data. Using different data types is another way to achieve varying levels of compression. For example, a higher precision data type can be used to represent values of the coefficients in the vector X and/or the vector C to get a more accurate representation of ionospheric TEC values for certain regions or time periods. A lower precision data type can be used to represent values of the coefficients in the vector X and/or the vector C to achieve more compression in representing ionospheric TEC values for certain regions and/or time periods. The choice of data type can also depend on the degree and order chosen for the spherical harmonic function. As discussed above, higher degree and/or order can be used for less compression when the ionosphere is relatively active. Generally, the magnitudes of the coefficients become smaller as the degree or order of the spherical harmonic function increase, and a less precise data type may be sufficient to represent higher order coefficients in such instances. However, for any given combination of a degree n and an order m, there will generally be significant variation among the magnitudes of the coefficients, so a mix of data types may be useful to represent the coefficients regardless of the degree and order chosen. Thus, a compressed form of the augmentation data received in block 602 could include, for example, a mix of 16-bit unsigned integers and 64-bit double-precision floating-points.

At 608, the one or more vectors from 606 are stored as a compressed representation of the augmentation data received in 602. The one or more vectors can be stored in a memory of the UE and retrieved for later use as part of correcting the ionospheric error in a positioning measurement of a GNSS signal. For example, as described above, a historical TEC value from a prior measurement period can be used to extrapolate a TEC value for current measurement period when the TEC value for the current measurement period is unavailable. It should be noted that although the augmentation data is compressed, it does not necessarily have to be decompressed in order to be used for correcting a positioning measurement. Instead, as described above, a TEC value can be determined based on a simple lookup operation or by inputting the latitude and longitude coordinates of the relevant pierce point into a spherical harmonic function represented by the one or more vectors. Thus, a UE or other device performing a correction need not regenerate all the values that were received for the augmentation data in 602.

Figures 10A, 10B:
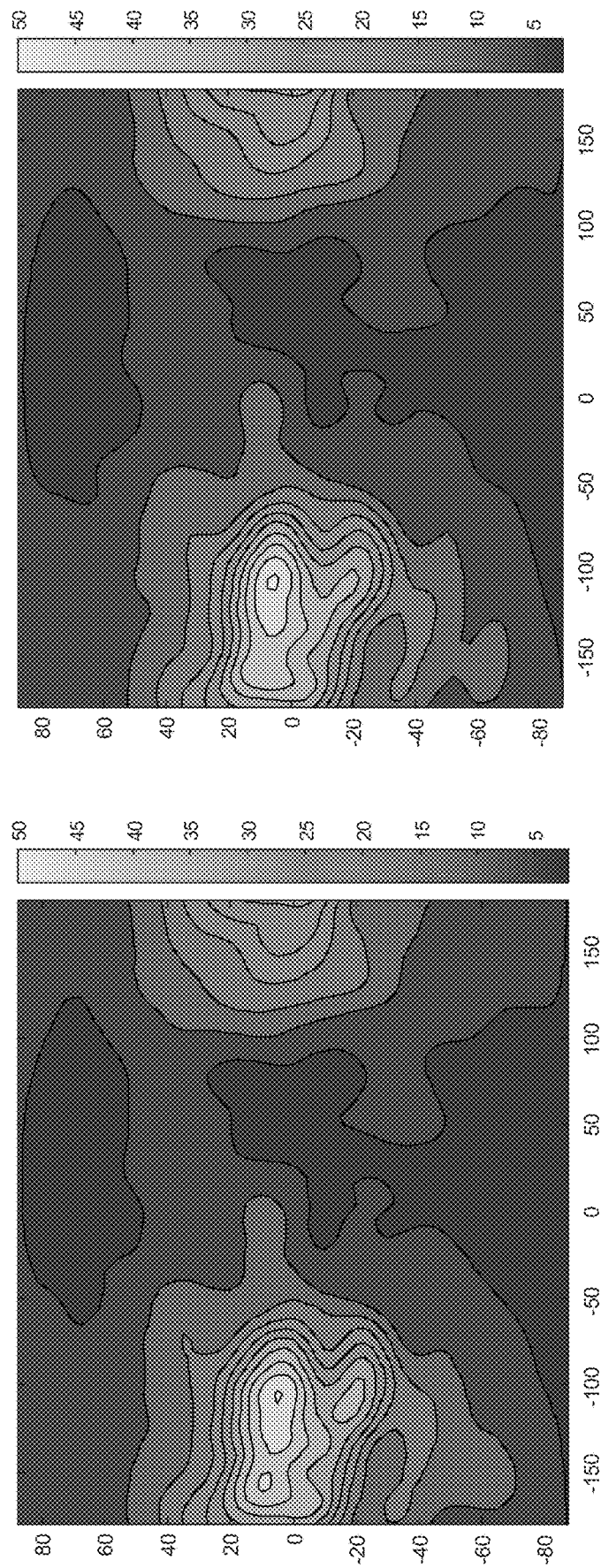
FIG. 10A is a graphical representation of example TEC values for a geographic region.
FIG. 10B is a graphical representation of example results of compressing the TEC values from FIG. 10A.

FIG. 10A is a graphical representation of example TEC values for a geographic region. The horizontal axis represents degrees longitude. The vertical axis represents degrees latitude. Darker areas represent locations with lower TEC value, whereas lighter areas represent locations with higher TEC value, with TEC values ranging from 0 to 50 TECU. The TEC values in FIG. 10A were obtained from an IGS GIM grid and therefore cover the entire globe. The TEC values from the IGS GIM grid were represented as unsigned integers, for a total data size of 10,366 bytes.

FIG. 10B is a graphical representation of example results of compressing the TEC values from FIG. 10A. The compression was produced using a spherical harmonic function of degree 16 and order 12 and double-precision floating-points, for a total data size of 2,152 bytes. Comparing FIG. 10A to FIG. 10B, it can be seen that the compressed representation in FIG. 10B is a reasonable approximation of the non-compressed representation in FIG. 10A. Numerically, the difference between TECU values for corresponding points in FIGS. 10A and 10B is generally 1.5 TECU or less. Further, based on the total data size, a compression rate of approximately 21% was achieved despite using a higher precision data type for the compression.

FIG. 11 illustrates an embodiment of a UE 1102, which can be utilized as described herein above. For example, the UE 1102 can perform one or more of the functions of the methods shown in FIG. 5 or FIG. 6. The UE 1102 may also implement one or more of the UEs described above (e.g., the UE 105 in FIG. 1 or the UE 320 in FIG. 3). It should be noted that FIG. 11 is meant only to provide a generalized illustration of various components, any or all of which may be utilized as appropriate. It can be noted that, in some instances, components illustrated by FIG. 11 can be localized to a single physical device and/or distributed among various networked devices, which may be disposed at different physical locations. Furthermore, as previously noted, the functionality of the UEs discussed in the previously described embodiments may be executed by one or more of the hardware and/or software components illustrated in FIG. 11.

The UE 1102 is shown comprising hardware elements that can be electrically coupled via a bus 1105 (or may otherwise be in communication, as appropriate). The hardware elements may include a processing unit(s) 1110 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 11, some embodiments may have a separate DSP 1120, depending on desired functionality. Location determination and/or other determinations based on wireless communication may be provided in the processing unit(s) 1110 and/or wireless communication interface 1130 (discussed below). The UE 1102 also can include one or more input devices 1170, which can include without limitation one or more keyboards, touch screens, touch pads, microphones, buttons, dials, switches, and/or the like; and one or more output devices 1115, which can include without limitation one or more displays (e.g., touch screens), light emitting diodes (LEDs), speakers, and/or the like.

The UE 1102 may also include a wireless communication interface 1130 (e.g., corresponding to wireless communications subsystem 322 in FIG. 3), which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1102 to communicate with other devices as described in the embodiments above. The wireless communication interface 1130 may permit data and signaling to be communicated (e.g., transmitted and received) with a network, for example, via access points, various base stations and/or other access node types, and/or other network components, computer systems, and/or any other electronic devices described herein. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof.

Depending on desired functionality, the wireless communication interface 1130 may comprise a separate receiver and transmitter, or any combination of transceivers, transmitters, and/or receivers to communicate with base stations and other terrestrial transceivers, such as wireless devices and access points. The UE 1102 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from the Third Generation Partnership Project (3GPP). CDMA2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1102 can further include sensor(s) 1140. Sensors 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1102 may also include a Global Navigation Satellite System (GNSS) receiver 1180 capable of receiving signals 1184 from one or more GNSS satellites using an antenna 1182 (which could be the same as antenna 1132). Positioning based on GNSS signal measurement can be utilized to complement and/or incorporate the techniques described herein. The GNSS receiver 1180 can extract a position of the UE 1102, using conventional techniques, from GNSS satellites of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1180 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like. In some embodiments, the UE 1102 may include a separate wireless receiver capable of receiving signals from one or more satellites of an augmentation system.

It can be noted that, although GNSS receiver 1180 is illustrated in FIG. 11 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1110, DSP 1120, and/or a processing unit within the wireless communication interface 1130 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processing units, such as processing unit(s) 1110 or DSP 1120.

The UE 1102 may further include and/or be in communication with a memory 1160. The memory 1160 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the UE 1102 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the UE 1102 (and/or processing unit(s) 1110 or DSP 1120 within UE 1102). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method performed at a mobile device for determining ionospheric error, the method comprising: determining a positioning measurement of a Global Navigation Satellite System (GNSS) signal; obtaining augmentation data associated with Total Electron Content (TEC) values during one or more prior measurement periods; obtaining a pierce point of the GNSS signal; and determining an ionospheric error in the positioning measurement of the GNSS signal based on the pierce point and the augmentation data.

Clause 2. The method of clause 1, wherein the augmentation data comprises one or more TEC values during a previous day.

Clause 3. The method of clause 2, wherein the augmentation data comprises a TEC value at the pierce point during a particular time in the previous day, the particular time being later than a time of day that the GNSS signal was received.

Clause 4. The method of any of clauses 1-3, wherein the obtaining of the augmentation data is performed in response to determining that one or more TEC values during a current measurement period are unavailable.

Clause 5. The method of any of clauses 1-4, further comprising: extrapolating a first TEC value for a current measurement period, using the augmentation data; and determining the ionospheric error in the positioning measurement based on the first TEC value.

Clause 6. The method of clause 5, wherein the extrapolating of the first TEC value uses a second TEC value included in the augmentation data in combination with at least one TEC value received for the current measurement period.

Clause 7. The method of any of clauses 1-6, wherein the extrapolating of the first TEC value comprises determining the first TEC value as a weighted sum of a second TEC value included in the augmentation data plus one or more additional TEC values, the one or more additional TEC values including a third TEC value received for the current measurement period, a fourth TEC value included in the augmentation data, or both.

Clause 8. The method of any of clauses 1-4, further comprising: determining the ionospheric error in the positioning measurement using a TEC value included in the augmentation data as a substitute for a TEC value that would have been included in augmentation data that is for a current measurement period and unavailable.

Clause 9. The method of any of clauses 1-8, further comprising: receiving, by the mobile device, the augmentation data as a compressed representation of a grid that contains the TEC values during the one or more prior measurement periods, wherein the compressed representation includes coefficients of a spherical harmonic function.

Clause 10. The method of any of clauses 1-8, further comprising: generating, by the mobile device, the augmentation data as a compressed representation of a grid that contains the TEC values during the one or more prior measurement periods, wherein the generating of the compressed representation comprises determining coefficients of a spherical harmonic function.

Clause 11. The method of clause 10, wherein the generating of the compressed representation further comprises: determining a degree n and an order m of the spherical harmonic function based on a difference between TEC values at different grid points.

Clause 12. The method of clause 11, wherein the determining of the degree n and the order m comprises: selecting a larger degree n or order m when the difference between TEC values at the different grid points indicates a higher amount of ionospheric activity than when the difference between TEC values at the different grid points indicates a lower amount of ionospheric activity.

Clause 13. The method of any of clauses 10-12, wherein the generating of the compressed representation further comprises: representing values of the coefficients using a combination of a higher precision data type and a lower precision data type.

Clause 14. A mobile device comprising: a Global Navigation Satellite System (GNSS) receiver configured to receive a GNSS signal from a navigation satellite; a wireless communication interface configured to communicate with an augmentation system; a memory; and one or more processing units communicatively coupled with the GNSS receiver, the wireless communication interface, and the memory, the one or more processing units configured to: determine a positioning measurement of the GNSS signal; obtain augmentation data associated with Total Electron Content (TEC) values during one or more prior measurement periods; obtain a pierce point of the GNSS signal; and determine an ionospheric error in the positioning measurement of the GNSS signal based on the pierce point and the augmentation data.

Clause 15. The mobile device of clause 14, wherein the augmentation data comprises one or more TEC values during a previous day.

Clause 16. The mobile device of clause 15, wherein the augmentation data comprises a TEC value at the pierce point during a particular time in the previous day, the particular time being later than a time of day that the GNSS signal was received by the GNSS receiver.

Clause 17. The mobile device of any of clauses 14-16, wherein the one or more processing units are configured to obtain the augmentation data in response to determining that one or more TEC values during a current measurement period are unavailable.

Clause 18. The mobile device of any of clauses 14-17, wherein the one or more processing units are further configured to: extrapolate a first TEC value for a current measurement period, using the augmentation data; and determine the ionospheric error in the positioning measurement based on the first TEC value.

Clause 19. The mobile device of clause 18, wherein to extrapolate the first TEC value, the one or more processing units are configured to use a second TEC value included in the augmentation data in combination with at least one TEC value received for the current measurement period.

Clause 20. The mobile device of any of clauses 14-19, wherein to extrapolate the first TEC value, the one or more processing units are configured to determine the first TEC value as a weighted sum of a second TEC value included in the augmentation data plus one or more additional TEC values, the one or more additional TEC values including a third TEC value received for the current measurement period, a fourth TEC value included in the augmentation data, or both.

Clause 21. The mobile device of any of clauses 14-17, wherein the one or more processing units are configured to, when augmentation data for a current measurement period is unavailable, determine the ionospheric error in the positioning measurement using a TEC value included in the augmentation data as a substitute for a TEC value that would have been included in the augmentation data for the current measurement period.

Clause 22. The mobile device of any of clauses 14-21, wherein the mobile device is configured to receive the augmentation data as a compressed representation of a grid that contains the TEC values during the one or more prior measurement periods, and wherein the compressed representation includes coefficients of a spherical harmonic function.

Clause 23. The mobile device of any of clauses 14-21, wherein the one or more processing units are configured to generate the augmentation data as a compressed representation of a grid that contains the TEC values during the one or more prior measurement periods, and wherein to generate the compressed representation, the one or more processing units are configured to determine coefficients of a spherical harmonic function.

Clause 24. The mobile device of clause 23, wherein to generate the compressed representation, the one or more processing units are configured to determine a degree n and an order m of the spherical harmonic function based on a difference between TEC values at different grid points.

Clause 25. The mobile device of clause 24, wherein to determine the degree n and the order m, the one or more processing units are configured to select a larger degree n or order m when the difference between TEC values at the different grid points indicates a higher amount of ionospheric activity than when the difference between TEC values at the different grid points indicates a lower amount of ionospheric activity.

Clause 26. The mobile device of any of clauses 23-25, wherein to generate the compressed representation, the one or more processing units are configured to represent values of the coefficients using a combination of a higher precision data type and a lower precision data type.

Clause 27. A non-transitory computer-readable medium having instructions stored thereon, wherein the instructions, when executed by one or more processing units of a mobile device, cause the one or more processing units to perform the following: determining a positioning measurement of a Global Navigation Satellite System (GNSS) signal; obtaining augmentation data associated with Total Electron Content (TEC) values during one or more prior measurement periods; obtaining a pierce point of the GNSS signal; and determining an ionospheric error in the positioning measurement of the GNSS signal based on the pierce point and the augmentation data.

Clause 28. The non-transitory computer-readable medium of clause 27, wherein the augmentation data comprises one or more TEC values during a previous day.

Clause 29. The non-transitory computer-readable medium of clause 27 or 28, wherein the instructions further cause the one or more processing units to generate the augmentation data as a compressed representation of a grid that contains the TEC values during the one or more prior measurement periods, and to determine coefficients of a spherical harmonic function as part of generating the compressed representation.

Clause 30. A system comprising: a Global Navigation Satellite System (GNSS) receiver configured to receive a GNSS signal from a navigation satellite; a wireless communication interface configured to communicate with an augmentation system; one or more processing units configured to determine a positioning measurement of the GNSS signal; means for obtaining augmentation data associated with Total Electron Content (TEC) values during one or more prior measurement periods; means for obtaining a pierce point of the GNSS signal; and means for determining an ionospheric error in the positioning measurement of the GNSS signal based on the pierce point and the augmentation data.

Clause 31. The system of clause 30, further comprising: means for generating the augmentation data as a compressed representation of a grid that contains the TEC values during the one or more prior measurement periods, wherein the means for generating the augmentation data is configured to determine coefficients of a spherical harmonic function as part of generating the compressed representation.

What is claimed is:

1. A method performed at a mobile device for determining ionospheric error, the method comprising:

determining, by one or more processing units of the mobile device, a positioning measurement of a Global Navigation Satellite System (GNSS) signal;

obtaining, from an augmentation system in wireless communication with the mobile device or from a memory of the mobile device, augmentation data associated with historical Total Electron Content (TEC) values, wherein the augmentation data was generated to represent ionospheric delay during a time period that ended before the augmentation data is obtained;

extrapolating, using the augmentation data, a value indicative of an ionospheric delay in the GNSS signal as observed by the mobile device;

obtaining a pierce point of the GNSS signal; and determining, by the one or more processing units, an ionospheric error in the positioning measurement of the GNSS signal based on the pierce point and the value indicative of the ionospheric delay in the GNSS signal.

2. The method of claim 1, wherein the augmentation data comprises one or more TEC values during a previous day.

3. The method of claim 2, wherein the augmentation data comprises a TEC value at the pierce point during a particular time in the previous day, the particular time being later than a time of day that the GNSS signal was received.

4. The method of claim 1, wherein the obtaining of the augmentation data is performed in response to determining that the mobile device is unable to obtain newer augmentation data.

5. The method of claim 1, wherein the value indicative of the ionospheric delay in the GNSS signal comprises a first TEC value extrapolated for a current measurement period, the method further comprising:

determining the ionospheric error in the positioning measurement based on the first TEC value.

6. The method of claim 5, wherein the extrapolating of the first TEC value uses a second TEC value included in the augmentation data in combination with at least one TEC value received for the current measurement period.

7. The method of claim 5, wherein the extrapolating of the first TEC value comprises determining the first TEC value as a weighted sum of a second TEC value included in the augmentation data plus one or more additional TEC values, the one or more additional TEC values including a third TEC value received for the current measurement period, a fourth TEC value included in the augmentation data, or both.

8. The method of claim 1, further comprising:

determining the ionospheric error in the positioning measurement using a TEC value included in the augmentation data as a substitute for a TEC value that would have been included in augmentation data generated to represent ionospheric delay during a later time period.

9. The method of claim 1, further comprising:

receiving, by the mobile device, the augmentation data as a compressed representation of a grid that contains the historical TEC values, wherein the compressed representation includes coefficients of a spherical harmonic function.

10. The method of claim 1, further comprising:

generating, by the mobile device, the augmentation data as a compressed representation of a grid that contains the historical TEC values, wherein the generating of the compressed representation comprises determining coefficients of a spherical harmonic function.

11. The method of claim 10, wherein the generating of the compressed representation further comprises:

determining a degree n and an order m of the spherical harmonic function based on a difference between TEC values at different grid points.

12. The method of claim 11, wherein the determining of the degree n and the order m comprises:

selecting a larger degree n or order m when the difference between TEC values at the different grid points indicates a higher amount of ionospheric activity than when the difference between TEC values at the different grid points indicates a lower amount of ionospheric activity.

13. The method of claim 10, wherein the generating of the compressed representation further comprises:

representing values of the coefficients using a combination of a higher precision data type and a lower precision data type.

14. A mobile device comprising:

a Global Navigation Satellite System (GNSS) receiver configured to receive a GNSS signal from a navigation satellite;

a wireless communication interface configured to communicate with an augmentation system;

a memory; and one or more processing units communicatively coupled with the GNSS receiver, the wireless communication interface, and the memory, the one or more processing units configured to:

determine a positioning measurement of the GNSS signal;

obtain, from the augmentation system or the memory of the mobile device, augmentation data associated with historical Total Electron Content (TEC) values, wherein the augmentation data was generated to represent ionospheric delay during a time period that ended before the augmentation data is obtained;

extrapolate, using the augmentation data, a value indicative of an ionospheric delay in the GNSS signal as observed by the mobile device;

obtain a pierce point of the GNSS signal; and determine an ionospheric error in the positioning measurement of the GNSS signal based on the pierce point and the value indicative of the ionospheric delay in the GNSS signal.

15. The mobile device of claim 14, wherein the augmentation data comprises one or more TEC values during a previous day.

16. The mobile device of claim 15, wherein the augmentation data comprises a TEC value at the pierce point during a particular time in the previous day, the particular time being later than a time of day that the GNSS signal was received by the GNSS receiver.

17. The mobile device of claim 14, wherein the one or more processing units are configured to obtain the augmentation data in response to determining that the mobile device is unable to obtain newer augmentation data.

18. The mobile device of claim 14, wherein the value indicative of the ionospheric delay in the GNSS signal comprises a first TEC value extrapolated for a current measurement period, and wherein the one or more processing units are further configured to:

determine the ionospheric error in the positioning measurement based on the first TEC value.

19. The mobile device of claim 18, wherein to extrapolate the first TEC value, the one or more processing units are configured to use a second TEC value included in the augmentation data in combination with at least one TEC value received for the current measurement period.

20. The mobile device of claim 18, wherein to extrapolate the first TEC value, the one or more processing units are configured to determine the first TEC value as a weighted sum of a second TEC value included in the augmentation data plus one or more additional TEC values, the one or more additional TEC values including a third TEC value received for the current measurement period, a fourth TEC value included in the augmentation data, or both.

21. The mobile device of claim 14, wherein the one or more processing units are configured to determine the ionospheric error in the positioning measurement using a TEC value included in the augmentation data as a substitute for a TEC value that would have been included in augmentation data generated to represent ionospheric delay during a later time period.

22. The mobile device of claim 14, wherein the mobile device is configured to receive the augmentation data as a compressed representation of a grid that contains the historical TEC values, and wherein the compressed representation includes coefficients of a spherical harmonic function.

23. The mobile device of claim 14, wherein the one or more processing units are configured to generate the augmentation data as a compressed representation of a grid that contains the historical TEC values, and wherein to generate the compressed representation, the one or more processing units are configured to determine coefficients of a spherical harmonic function.

24. The mobile device of claim 23, wherein to generate the compressed representation, the one or more processing units are configured to determine a degree n and an order m of the spherical harmonic function based on a difference between TEC values at different grid points.

25. The mobile device of claim 24, wherein to determine the degree n and the order m, the one or more processing units are configured to select a larger degree n or order m when the difference between TEC values at the different grid points indicates a higher amount of ionospheric activity than when the difference between TEC values at the different grid points indicates a lower amount of ionospheric activity.

26. The mobile device of claim 23, wherein to generate the compressed representation, the one or more processing units are configured to represent values of the coefficients using a combination of a higher precision data type and a lower precision data type.

27. A non-transitory computer-readable medium having instructions stored thereon, wherein the instructions, when executed by one or more processing units of a mobile device, cause the one or more processing units to perform the following:

determining a positioning measurement of a Global Navigation Satellite System (GNSS) signal;

obtaining, from an augmentation system in wireless communication with the mobile device or from a memory of the mobile device, augmentation data associated with historical Total Electron Content (TEC) values, wherein the augmentation data was generated to represent ionospheric delay during a time period that ended before the augmentation data is obtained;

extrapolating, using the augmentation data, a value indicative of an ionospheric delay in the GNSS signal as observed by the mobile device;

obtaining a pierce point of the GNSS signal; and determining an ionospheric error in the positioning measurement of the GNSS signal based on the pierce point and the value indicative of the ionospheric delay in the GNSS signal.

28. The non-transitory computer-readable medium of claim 27, wherein the augmentation data comprises one or more TEC values during a previous day.

29. The non-transitory computer-readable medium of claim 27, wherein the instructions further cause the one or more processing units to generate the augmentation data as a compressed representation of a grid that contains the historical TEC values, and to determine coefficients of a spherical harmonic function as part of generating the compressed representation.

30. A system comprising:
a Global Navigation Satellite System (GNSS) receiver configured to receive a GNSS signal from a navigation satellite;
a wireless communication interface configured to communicate with an augmentation system;
one or more processing units configured to determine a positioning measurement of the GNSS signal;
means for obtaining augmentation data associated with historical Total Electron Content (TEC) values, wherein the augmentation data was generated to represent ionospheric delay during a time period that ended before the augmentation data is obtained;
means for extrapolating, using the augmentation data, a value indicative of an ionospheric delay in the GNSS signal as received by the GNSS receiver;
means for obtaining a pierce point of the GNSS signal; and
means for determining an ionospheric error in the positioning measurement of the GNSS signal based on the pierce point and the value indicative of the ionospheric delay in the GNSS signal.

* * * * *